United States Patent
Mere et al.

(10) Patent No.: US 11,487,301 B2
(45) Date of Patent: Nov. 1, 2022

(54) METHOD AND DEVICE FOR GENERATING AN OPTIMUM VERTICAL TRAJECTORY INTENDED TO BE FOLLOWED BY AN AIRCRAFT

(71) Applicant: Airbus Operations (S.A.S.), Toulouse (FR)

(72) Inventors: Jean-Claude Mere, Verfeil (FR); Ramon Andreu Altava, Toulouse (FR)

(73) Assignee: Airbus Operations (SA.S.), Toulouse (FR)

( * ) Notice: Subject to any disclaimer, the term of this patent is extended or adjusted under 35 U.S.C. 154(b) by 492 days.

(21) Appl. No.: 16/714,880

(22) Filed: Dec. 16, 2019

(65) Prior Publication Data

US 2020/0192405 A1 Jun. 18, 2020

(30) Foreign Application Priority Data

Dec. 17, 2018 (FR) ...................................... 1873084

(51) Int. Cl.
*G05D 1/08* (2006.01)
*B64D 43/00* (2006.01)
(Continued)

(52) U.S. Cl.
CPC ........... *G05D 1/0808* (2013.01); *B64D 43/00* (2013.01); *G06N 3/08* (2013.01); *G06N 3/04* (2013.01)

(58) Field of Classification Search
CPC ........ G05D 1/0808; B64D 43/00; G06N 3/08; G06N 3/04
See application file for complete search history.

(56) References Cited

U.S. PATENT DOCUMENTS

| 5,321,489 A * | 6/1994 | Defour | G01S 7/481 342/29 |
| 2002/0033769 A1* | 3/2002 | Bass | G01S 5/12 342/418 |

(Continued)

FOREIGN PATENT DOCUMENTS

FR 3 043 456 A1 5/2017

OTHER PUBLICATIONS

Hagelauer et al., "A soft dynamic programming approach for on-line aircraft 4D-trajectory optimization," European Journal of Operational Research, vol. 107, pp. 87-95, 1998.

(Continued)

*Primary Examiner* — Hussein Elchanti
(74) *Attorney, Agent, or Firm* — Jenkins, Wilson, Taylor & Hunt, PA (57) ABSTRACT

A method and device for generating an optimum aircraft vertical trajectory, including a unit performing iterative processing to determine, on each iteration, a next state from a computational state, by using an estimated overall cost for next states, each estimated overall cost, which is computed by a cost computation unit, being equal to the sum of a real cost computed up to the next state under consideration by using predetermined constraints and a cost estimated up to the current state of the aircraft. The estimated cost is computed using a deterministic neural network based on performance calculations for the aircraft without using energy constraints, allowing computation of this estimated cost and the estimated overall cost to be performed rapidly. The iterative processing is repeated until the determined state is situated in proximity to the current state of the aircraft, the corresponding trajectory part forming the optimum vertical trajectory.

9 Claims, 2 Drawing Sheets

(51) Int. Cl.
*G06N 3/08* (2006.01)
*G06N 3/04* (2006.01)

(56) References Cited

U.S. PATENT DOCUMENTS

| | | | | |
|---|---|---|---|---|
| 2005/0230563 | A1* | 10/2005 | Corcoran | G05D 1/104 |
| | | | | 244/175 |
| 2009/0257314 | A1* | 10/2009 | Davis | G01S 5/18 |
| | | | | 367/125 |
| 2010/0100269 | A1* | 4/2010 | Ekhaguere | G08G 5/0086 |
| | | | | 701/26 |
| 2010/0238956 | A1* | 9/2010 | Preuss | H04W 56/0035 |
| | | | | 370/503 |
| 2011/0299732 | A1* | 12/2011 | Jonchery | G06V 10/245 |
| | | | | 382/103 |
| 2013/0179067 | A1* | 7/2013 | Trowbridge | G01C 21/3484 |
| | | | | 701/410 |
| 2015/0302858 | A1* | 10/2015 | Hearing | G10L 25/18 |
| | | | | 381/58 |
| 2016/0111006 | A1* | 4/2016 | Srivastava | G08G 5/0043 |
| | | | | 701/3 |
| 2016/0189549 | A1* | 6/2016 | Marcus | G08G 5/0008 |
| | | | | 701/3 |
| 2017/0132942 | A1 | 5/2017 | Mere | |
| 2017/0148467 | A1* | 5/2017 | Franklin | G10L 25/39 |
| 2017/0154535 | A1* | 6/2017 | Downey | G07C 5/008 |
| 2017/0162064 | A1* | 6/2017 | Ubhi | G05D 1/106 |
| 2017/0178518 | A1* | 6/2017 | Foladare | G01C 21/20 |
| 2017/0243494 | A1* | 8/2017 | Taveira | G08G 5/0069 |
| 2017/0267343 | A1* | 9/2017 | Chen | G08G 5/0026 |

OTHER PUBLICATIONS

Altava et al., "Flight Management System Pathfinding Algorithm for Automatic Vertical Trajectory Generation," AIAA 37th Digital Avionics Systems Conference (DASC), IEEE, pp. 1-9, 2018.
French Search Report for Application No. 1873084 dated Sep. 30, 2019.

* cited by examiner

METHOD AND DEVICE FOR GENERATING AN OPTIMUM VERTICAL TRAJECTORY INTENDED TO BE FOLLOWED BY AN AIRCRAFT

CROSS-REFERENCE TO RELATED APPLICATION

This application claims priority to French patent application 18 73084 filed on Dec. 17, 2018, the entire disclosure of which is incorporated by reference herein.

TECHNICAL FIELD

The disclosure herein relates to a method and a device for real-time generation of at least one optimum vertical trajectory for a flight trajectory intended to be followed by an aircraft, in particular a transport aircraft.

More particularly, an object of the disclosure herein is to generate, using onboard means, an optimized trajectory in real time, the optimized trajectory being flyable in particular in restricted dynamic environments, that is to say in environments likely to contain objects (or obstacles) with which the aircraft must avoid colliding.

Although not exclusively, the disclosure herein applies more particularly to approach trajectories in a descent and approach phase, for the purpose of landing on a landing strip of an airport.

BACKGROUND

It is known that energy management during the descent and approach of an aircraft, in particular transport aircraft, is generally left to the discretion of the aircraft's crew, who need to evaluate the energy situation of the aircraft and take the appropriate piloting actions in order to manage any instances of an excess of energy or a deficit of energy for the aircraft. In some situations in which the aircraft has been diverted from its reference trajectory, for example for traffic management reasons, the combination of this energy management and the modification of the flight plan, which requires multiple interactions with the aircraft's systems, produces a large workload for the crew.

It is consequently possible that the pilot of an aircraft aiming to arrive at a target point manages the energy of the aircraft badly and overshoots this target point, for example by arriving at the target point too quickly or at excessive altitude. If the target point in the approach phase is a so-called stabilization point, the aircraft then has to repeat a flight pattern before landing, resulting in a loss of time.

The document FR 3 043 456 discloses a method and a device for generating an optimum vertical trajectory for a flight trajectory for an aircraft, in particular a transport aircraft, which flight trajectory is defined in an environment likely to contain obstacles (in particular moving obstacles). The device comprises a data processing unit implementing iterative processing in order to generate an optimum vertical trajectory between an initial state and a final state on the basis of flight strategies.

The device allows a vertical trajectory to be created that is optimized, that is free of any collision with surrounding obstacles, in particular moving obstacles, and that complies with energy constraints.

Nevertheless, as all the trajectory and energy optimization calculations are performed by the device (or computer) of the aircraft, the computation time is long.

SUMMARY

An object of the disclosure herein is to overcome this disadvantage. The disclosure herein relates to a method for generating an optimum vertical trajectory for an aircraft, the vertical trajectory being defined between a so-called current state of the aircraft, including a current position of the aircraft, and a so-called target state, including a target position (or point).

According to the disclosure herein, the method comprising a processing step implemented by a data processing unit, the processing step including a succession of substeps implemented iteratively, the processing step consisting in or comprising determining, on each iteration, a so-called next state from a so-called computational state, each next state thus determined having an associated trajectory part defined between the (initial) target state and the next state, according to which method the state determined in the processing step for a given iteration is used in the next iteration as computational state and the computational state taken into account during the first iteration is the target state, according to which method the processing step is implemented until the determined next state is situated at least in a predetermined proximity to the current state of the aircraft, the trajectory part associated with this state situated in a predetermined proximity to the current state of the aircraft forming the optimum vertical trajectory, the method also comprising a data transmission step, implemented by a data transmission link, consisting in or comprising transmitting at least the optimum vertical trajectory to at least one user system, is remarkable in that the processing step includes, in order to determine a next state on each iteration, the succession of substeps that follow:

- a generation substep consisting in or comprising generating one or more next states from the computational state;
- a cost computation substep consisting in or comprising computing an estimated overall cost for each of the next states generated in the generation substep, the estimated overall cost being equal to the sum of a real cost computed between the (initial) target state and the next state under consideration by taking into account predetermined constraints and an estimated cost computed between the next state under consideration and the current state of the aircraft, the estimated cost being computed using at least one deterministic neural network based on performance calculations for the aircraft without taking into account energy constraints, the states corresponding to nodes of the neural network; and
- an identification substep consisting in or comprising identifying, among the next states generated in the generation substep, the state having the lowest estimated overall cost, the state thus identified representing the so-called next state in the iteration under consideration.

Thus, because of the use of a neural network allowing rapid and precise computation of a cost estimate between the next state (or node) under consideration and a final state (namely the current state of the aircraft) by breaking free of constraints, (for example energy constraints), the estimated overall cost can be computed rapidly for each of the next states under consideration in order to be able to select or give preference to those having the lowest estimated overall cost during the iterative processing.

The length of time for generating the flight trajectory is thus reduced, allowing the aforementioned disadvantage to be overcome.

The method in accordance with the disclosure herein therefore allows a vertical trajectory that is optimized and complies with constraints (for example energy constraints) to be created, in real time, using reasonable computation capabilities, the vertical trajectory allowing the current position (or current point) of the aircraft to be connected to a target position (or point) defined by an operator, generally the aircraft's pilot. This target position may, for example, correspond to the stabilization point during an approach.

Advantageously, in the cost computation substep, for each next state under consideration, the next state and the current state of the aircraft are entered into the neural network, which computes the estimated cost between the next state and the current state of the aircraft, Moreover, in one embodiment, in the cost computation substep, the estimated cost is corrected by taking into account atmospheric conditions, the estimated cost thus corrected being used to compute the estimated overall cost. Furthermore, advantageously, in the neural network, a node representing a state is defined at least by a distance in relation to a predetermined position, an altitude, a speed and at least one flight parameter.

Moreover, in an advantageous manner, in order to generate one or more next states from the computational state, the generation substep uses movement equations for the aircraft integrating total slope and energy sharing factor values.

In one embodiment, the method includes a learning step, implemented subsequently to the processing step, consisting in or comprising subjecting the neural network to learning. Preferably, the input data that the learning step uses for the learning of the neural network are an initial position, a final position and a cost for a plurality of optimum trajectories, the optimum trajectories being defined for different and constraint-free initial and final conditions.

The disclosure herein also relates to a device for generating an optimum vertical trajectory for an aircraft, the vertical trajectory being defined between a so-called current state of the aircraft, including a current position of the aircraft, and a so-called target state, including a target position.

According to the disclosure herein, the device of the type including:
- a data input unit;
- a data processing unit implementing iterative processing, the data processing unit being configured to determine, on each iteration, a so-called next state from a so-called computational state, each next state thus determined having an associated trajectory part defined between the target state and the next state, the state determined in a given iteration being used in the next iteration as computational state, the computational state taken into account during the first iteration being the target state, the data processing unit repeating the iterative processing until the determined state is situated at least in a predetermined proximity to the current state of the aircraft, the trajectory part associated with this state situated in a predetermined proximity to the current state of the aircraft forming the optimum vertical trajectory; and
- a data transmission link consisting in or comprising transmitting at least he optimum vertical trajectory to at least one user system, is remarkable in that the data processing unit includes:
- a generation unit consisting in or comprising generating, on each iteration, one or more next states from the computational state;
- a cost computation unit consisting in or comprising computing an estimated overall cost for each of the next states generated by the generation unit, the estimated overall cost being equal to the sum of a real cost computed between the (initial) target state and the next state under consideration by taking into account predetermined constraints and an estimated cost computed between the next state under consideration and the current state of the aircraft, the estimated cost being computed using at least one deterministic neural network;
- the neural network, which is based on performance calculations for the aircraft without taking into account energy constraints, the states corresponding to nodes of the neural network; and
- an identification unit consisting in or comprising identifying, among the next states generated by the generation unit, the state having the lowest estimated overall cost (computed by the cost computation unit), the state thus identified representing the so-called next state in the iteration under consideration.

In one particular embodiment, the device includes, as user system, a display unit configured to display at least the optimum vertical trajectory.

BRIEF DESCRIPTION OF THE FIGURES

The appended figures will clarify how the disclosure herein can be implemented. In the figures, identical references denote similar elements.

DETAILED DESCRIPTION

Figure 1:
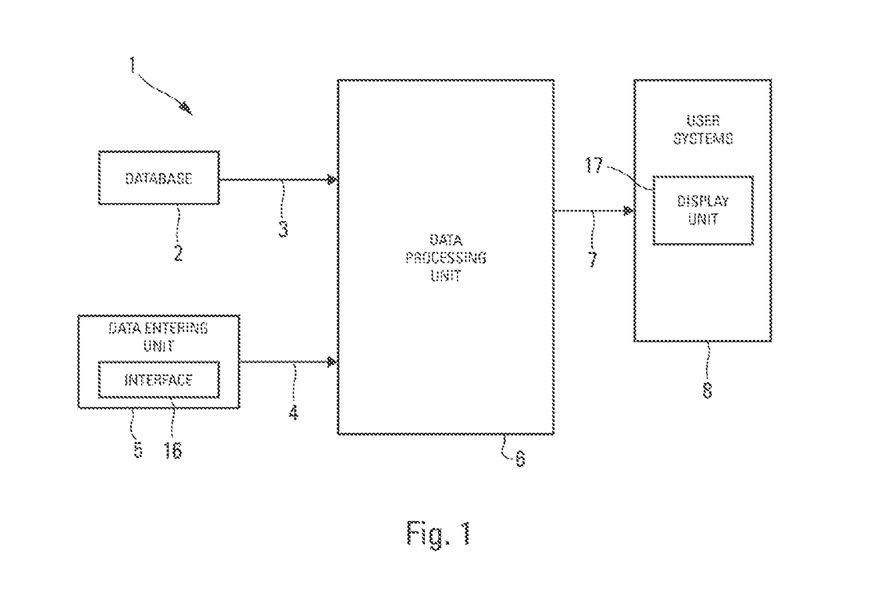
FIG. 1 is the block diagram of a particular embodiment of a device for generating an optimum vertical trajectory.

The device 1 that allows the disclosure herein to be illustrated and is represented schematically in FIG. 1 is intended to build at least one vertical trajectory TV for a flight trajectory intended to be followed by an aircraft AC (FIG. 3), in particular a transport aircraft.

Figure 3:
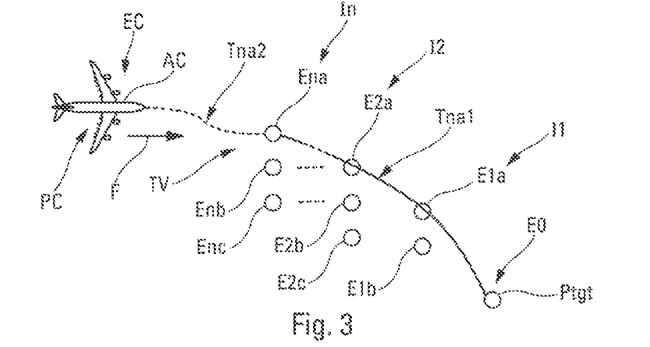
FIG. 3 is a schematic representation allowing the generation, according to the disclosure herein, of an optimum vertical trajectory to be explained.

The flight trajectory comprises a lateral (or horizontal) trajectory defined in a horizontal plane, and the vertical trajectory defined in a vertical plane. It is formed so as to connect a current point (corresponding to the current position PC of the aircraft AC), at which the aircraft AC has a so-called current state EC, to a target position (or point) Ptgt, at which the aircraft AC has a so-called target state E0, as shown in FIG. 3.

A state comprises a point (or position) in space, for example PC or Ptgt, defined by its altitude and its horizontal position, and one or more flight parameters for the aircraft AC. Preferably, the flight parameter(s) taken into account correspond to one or more of the following parameters:
- a speed of the aircraft AC;
- a mass of the aircraft AC;
- an aerodynamic configuration of the aircraft AC.

In one embodiment, it is possible to take into account atmospheric conditions such as the wind and/or a temperature difference ΔISA corresponding to the temperature difference between a measured outside temperature and a temperature of ISA (International Standard Atmosphere) type at the same altitude.

According to the disclosure herein, the device 1, which is aboard the aircraft, includes, as shown in FIG. 1:
- a set 2 (DATABASE) comprising one or more databases;
- a data input unit 5 (DATA ENTERING UNIT);
- a data processing unit 6 (DATA PROCESSING UNIT), which is connected by lines 3 and 4 to the set 2 and the data input unit 5, respectively, and which is configured to implement iterative processing with the aim of determining an optimum vertical trajectory; and
- a data transmission link 7 consisting in or comprising transmitting at least the optimum vertical trajectory to at least one user system from a set 8 of one or more user systems (USER SYSTEMS).

As specified below, the data processing unit 6 implements iterative processing. It is configured so as, on each iteration of this iterative processing, to determine a so-called next state from a so-called computational state. The state determined in a given iteration is used in the next iteration as computational state. The computational state taken into account during the first iteration is the target state E0 (at the target position Ptgt).

Each next state thus determined has an associated trajectory part defined between the target state and the next state. The data processing unit 6 repeats the iterative processing until the determined state is situated at least in a predetermined proximity to the current state EC of the aircraft AC (at the current point PC). The trajectory part associated with this state situated in proximity to the current state EC of the aircraft AC forms the generated optimum vertical trajectory TV.

Figure 2:
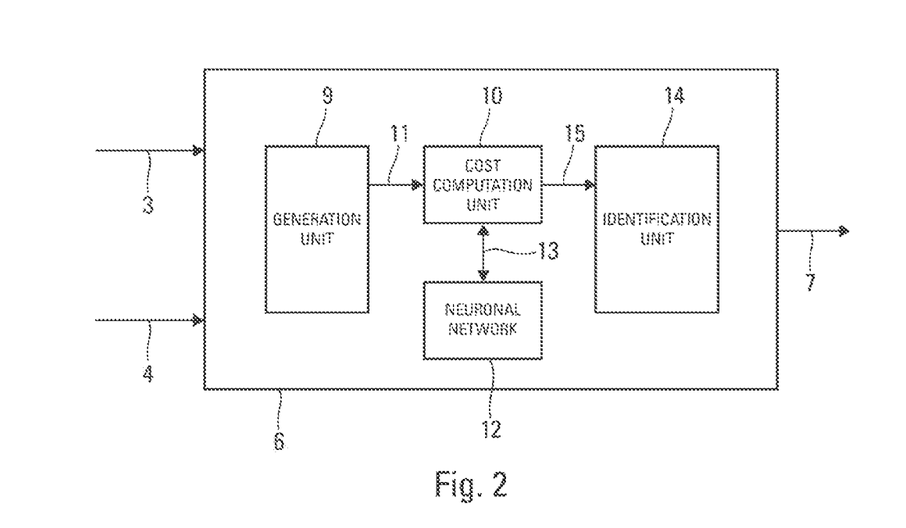
FIG. 2 is the block diagram of a data processing unit of the device of FIG. 1.

In order to implement the aforementioned iterative processing, the data processing unit (or central processing unit) 6 includes, as shown in FIG. 2:
- a generation unit 9 (GENERATION UNIT) configured to generate one or more next states from a computational state of the aircraft in a given (in particular predetermined) computation horizon. This computation horizon can correspond to a given flight time or to a given flight distance;
- a cost computation unit 10 (COST COMPUTATION UNIT) connected by a link 11 to the generation unit 9 and configured to compute an estimated overall cost CG for each of the next states generated by the generation unit 9. The estimated overall cost CG is equal to the sum of a real cost C1 computed (in the usual manner) between the target state E0 and the next state under consideration by taking into account predetermined constraints and an estimated cost C2 computed between the next state under consideration and the current state EC of the aircraft AC;
- a neural network 12 (NEURAL NETWORK) connected by a link 13 to the cost computation unit 10 and configured to compute the estimated cost C2. The neural network 12 is based on performance calculations for the aircraft without taking into account energy constraints. Within the context of the disclosure herein, the various states correspond to nodes of the neural network 12; and
- an identification unit 14 (IDENTIFICATION UNIT) connected by a link 15 to the cost computation unit 10 and configured to identify, among the next states generated by the generation unit 9, the state for which the estimated overall cost CG (computed by the cost computation unit 10) is lowest, the state thus identified representing the so-called next state in the iteration under consideration. The state identified by the identification unit 14 in a given iteration is used, where appropriate, by the generation unit 9 in the next iteration, as computational state.

The data processing unit 6 therefore repeats the iterative processing, implemented by the units 9, 10, 12 and 14, until the state identified by the identification unit 14 is situated at least in a predetermined proximity to the (final) current state EC. The vertical trajectory between the (initial) target state E0 and the state thus identified then represents the optimum vertical trajectory generated by the data processing unit 6 of the device 1.

Within the context of the disclosure herein, a state is considered to be situated in proximity to the current state EC when the difference between the current state EC and the state under consideration is below a state threshold. This state threshold can be a distance or a combination of criteria covered by the definition of the state (position, speed, flight parameter(s), etc.).

In order to generate one or more next states from the computational state, the generation unit 9 uses movement equations for the aircraft AC. In a preferred embodiment, the generation unit 9 uses movement equations integrating overall slope values for the aircraft AC and/or energy sharing factor ESF values on the basis of distance. In the usual manner, the energy sharing factor ESF illustrates sharing of the total energy loss between kinetic energy and potential energy.

The data processing unit 6 therefore performs the processing backwards, starting from the target position Ptgt (or final position in the direction of flight F of the aircraft AC, as shown in FIG. 3), for example the (fixed) stabilization point, and spreading the state of the aircraft AC (in the opposite direction to the direction F) towards the state closest to its current state EC (at the current point PC). Thus, the generated vertical trajectory TV is certain to pass through the target position Ptgt, and even if it does not begin precisely with the current state of the aircraft AC, the difference can easily be corrected by the guidance.

To speed up the convergence, the data processing unit 6 therefore uses a cost estimate (heuristic) computed by the neural network 12, which avoids development of nodes furthest away (in the direction of the chosen heuristic) from the optimum solution. For example, if it is an aim to optimize the fuel consumption of the aircraft AC, the heuristic is an estimate of the fuel needed by the aircraft AC in order to fly between the node Ena under consideration and the current position PC of the aircraft AC (FIG. 3).

Figure 4:
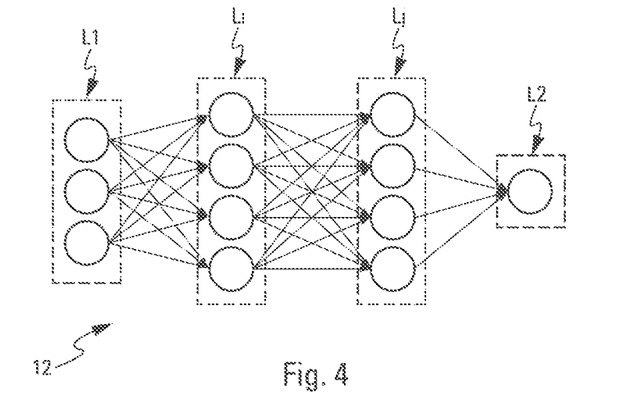
FIG. 4 is a schematic representation of a neural network forming part of a device for generating an optimum vertical trajectory.

FIG. 4 illustrates a simplified diagrammatic example of the neural network 12 used to estimate the heuristic. FIG. 4 shows an input layer L1 intended to receive the input data for a so-called next state that is under consideration Ena (namely the next state Ena and the current state EC of the aircraft AC), multiple hidden layers Li and Lj and an output layer L2 providing the estimated cost C2 at the output.

In addition to the target position Ptgt (representing the target state E0) and the current position PC of the aircraft AC (representing the current state EC), FIG. 3 shows multiple intermediate iterations with associated states (or nodes), namely an iteration I1 with states E1$a$ and E1$b$, an iteration I2 with states E2$a$, E2$b$ and E2$c$ and an iteration In with states Ena, Enb and Enc.

On the basis that the current iteration is the iteration In with, as the so-called next state, the state (or node) Ena to be considered, the estimated overall cost CG is estimated by virtue of the cost computation unit 10 computing the sum:

of the real cost C1 from the target state E0 to the state Ena. This real cost C1 is computed in the usual manner by a computational element (not shown), which is integrated in the cost computation unit 10, for example, and of the estimated cost C2 from the state Ena to the current state EC. The estimated cost C2 is computed by the neural network 12.

The cost CG (such that CG=C1+C2) is an overall cost (from E0 to EC), part (C2) of which is estimated.

The vertical (flight) trajectory part associated with the state Ena is the trajectory Tna1 shown in FIG. 3, which passes through the previously generated and selected states E1a and E2a. FIG. 3 also shows (in dashes) the remaining trajectory part Tna2 still to be determined up to the current position PC of the aircraft AC.

It is therefore expected that the estimation of the heuristic, which is a non-trivial matter for the case of a vertical aircraft profile, will be improved by using the deterministic neural network 12, which is based on performance calculations for the aircraft. The computation process for implementing this cost estimation is as follows. The computation is based on a method for searching a graph called A*. More precisely:

A/ large amounts of optimum trajectories are generated for very different initial and final conditions having no energy constraint, for the learning of the neural network 12. The initial and final points and the cost of the optimum trajectory are used as input data for the learning of the neural network 12. A database is used having all the trajectories generated upstream according to various criteria;

The algorithm is launched so that it generates thousands of trajectories and the costs. This cost computed using the initial and final states for each of the generated trajectories is used as input for the neural network. The database is used only for an optimization criterion. Therefore, if there is potentially a desire to change optimization criterion, it is necessary to develop a database for this other criterion and to teach the neural network. Optimization criteria can be in particular fuel consumed, noise generated, gas emissions, descent and approach time;

For example, in order to compute the fuel consumed between two points P1 and P2 as cost, the equations for the dynamics of the aircraft (point mass) are integrated starting from a point P1 up to arrival at the point P2 while observing all the restrictions that may apply between these points P1 and P2 (for example flight envelope, etc.);

B/ the neural network 12 learns to estimate the cost of a trajectory between a first state and a second state. The hyper-parameters of the network (number of layers etc.) are adjusted to refine the performance.

The neural network 12 is not used directly between initial and final points on account of the specific intermediate energy constraints in the case under consideration. The neural network 12 is used to compute a diminishing estimate (by breaking free of the energy constraints) of the residual cost C2 between the current node Ena and the current position PC in order to give preference to nodes that minimize the estimated overall cost CG.

Each node generated by the method A* calls upon the neural network 12, which immediately provides it with an estimate of the future cost (heuristic). This allows effective sorting of all nodes and, by developing first and foremost nodes that minimize this estimate of the cost in each iteration, more rapid convergence towards the optimum trajectory. This characteristic can be used to readapt the flight strategy to the dynamic conditions of the environment in real time.

The method for generating the trajectories used by the learning of the neural network is the method A*, but with no energy constraint linked to an arrival procedure (that is to say that only restrictions of flight envelope and acceleration limit type apply). The neural network 12 learns to correlate all the internal calculations and variables necessary for computing the cost of a trajectory and is capable of predicting an approximate cost simply by receiving an initial state and a final state.

The estimate is the lowest possible (or diminishing), because it is based on the computation of the trajectories without constraints. There is therefore no trajectory better than the one computed. As soon as constraints are added, optimality deteriorates. The algorithm A*, by using cost approximations (heuristic), will thus converge towards the solution.

What is known as an energy constraint is a type of constraint, either for altitude or for speed, linked to a given arrival procedure and is therefore specific to this given arrival procedure. By contrast, a restriction is a constraint specific to an aircraft (for example maximum speed or an acceleration limit for passenger comfort) and is therefore independent of the arrival procedure. The neural network is developed for a particular aircraft but must be able to be used in any approach procedure. Thus, the trajectories generated for the learning of the neural network take account of restrictions but not of energy constraints, whereas the vertical trajectory generated in real time takes account of restrictions and energy constraints.

Once the learning of the neural network 12 has finished, the neural network 12 does not store the computed trajectories, but stores weights/hyperparameters, relationships between parameters that will allow it to produce a convergence towards the diminishing solution as rapidly as possible. It is possible to improve the performance of the neural network by increasing the number of layers and/or the number of neurons per layer.

The neural network 12 is recorded in the data processing unit 6.

The use of the neural network 12 to compute the estimated cost thus allows a rapid estimate to be obtained without performing complex calculations. This allows the processing to be implemented in real time in one or more computers aboard the aircraft.

In particular, the data processing unit 6 can thus represent a computer connected to a flight management system of FMS type of the aircraft AC. This can be a module integrated in the FMS system or a module that is remote in relation to the FMS system, for example a module integrated in a portable electronic unit of EFB (Electronic Flight Bag) type that is connected to the FMS system. When the optimum vertical trajectory is determined by a unit of EFB type, it is transmitted to the FMS system of the aircraft in order to be implemented. Possibly, this trajectory can be modified by taking account of other criteria of the aircraft, for example released landing gear, etc.

Furthermore, in a preferred embodiment, the set 2 of databases of the device 1 can include in particular a ground database, a weather database and/or an aircraft performance database allowing estimation, through interpolation in tables, of a new state of the aircraft (altitude, speed, mass, configuration, etc.) from a preceding state following application of a flight strategy.

Furthermore, the data input unit 5 includes a set of information sources, such as sensors of the aircraft (weather radar to enhance a weather database, configuration sensors of the aircraft (flap, engine speed, released gear, etc.)) or measurement or computation systems.

The data input unit 5 also includes a human/machine interface 16 (INTERFACE) allowing an operator, in particular the aircraft's pilot, to enter parameters such as the target position Ptgt and/or one or more criteria used in the processing (weather, noise, etc.) into the device 1. This human/machine interface 16 can comprise various standard devices, for example a portable keyboard/screen set, such as a portable computer or a tablet, or else an internal device of avionics type (screen, keyboard and trackball in the cockpit, for example).

In one particular embodiment, the data input unit 5 also includes an information transmission system to allow at least automatic reception of data received from outside the aircraft.

Furthermore the device 1 (FIG. 1) includes in particular, as user system of the set 8, a display unit 17 (DISPLAY UNIT) configured to display at least the optimum vertical trajectory TV on a visual display screen in the aircraft's cockpit.

The set 8 can also include onboard systems such as an autopilot system, for example, the optimum trajectory being able to be used as a reference for automatic guidance, or else means to inform air traffic control (for example via a standard data transmission link) of the results of processing performed.

The device 1 may, moreover, be combined with a standard system for generating an optimum lateral trajectory or may include such a system, in order to obtain an optimized 4-D flight trajectory.

In addition to the information from the databases 2, the device 1 uses, in particular, a set of parameters configured by the pilot (using the interface 16) or left at default values. The only information indispensable for implementing the disclosure herein is the target position Ptgt (that is to say the point at which the pilot wants the generated trajectory to end). The target state E0 at this target position Ptgt is defined by a geometric position (latitude, longitude, altitude, course), but also potentially by appended restrictions (speed, mass, configuration, etc.). The most common target position Ptgt in the approach phase is the stabilization point (1000 or sometimes 1500 feet above the altitude of the threshold of the landing strip, at approach speed).

In a preferred application, the device 1 thus allows generation of an approach trajectory that takes account of the current energy situation of the aircraft and takes it in optimum fashion to an optimum energy situation at the stabilization point of the approach.

Because of the use of the neural network 12, which allows rapid and precise computation of an estimate of the cost C2 between the next state (or node) under consideration and a state to be reached (namely the current state E0 of the aircraft AC) by breaking free of existing constraints (for example energy constraints), the device 1 is able to rapidly compute the estimated overall cost CG for each of the next states under consideration, in order to be able to select or give preference to those having the lowest estimated overall cost during the iterative processing. The length of time for generating the vertical trajectory is thus reduced and can be implemented in real time.

Consequently, the device 1, as described above, creates, in real time, a vertical (flight) trajectory TV that has the following characteristics in particular:

it is optimized;
it complies with constraints, for example energy constraints; and
it allows the current position PC of the aircraft AC to be connected to the target position Ptgt defined by an operator, generally the aircraft's pilot.

The device 1 thus has the following advantages:
it allows the crew to be assisted in their onboard decision-making. Automatic trajectory generation aims to reduce the workload of the crew in situations that are considered complex on board. These situations are associated with a heavy workload for the pilot, due in particular to a change of environment (change of runway in the approach phase, for example); and
it allows a vertical trajectory to be produced that systematically passes through the aircraft and that is optimum, for display on onboard screens and possibly transmission to air traffic control for acceptance. This vertical trajectory can be used as a reference and coupled to a guidance computer for automatic tracking (enslaving the position of the aircraft to this trajectory).

The iterative processing implemented by the data processing unit 6 of the device 1 comprises a processing step S0. This processing step S0 includes a succession of substeps S1 to S3 shown in FIG. 5. This succession of substeps S1 to S3 is implemented automatically and repetitively.

Figure 5:
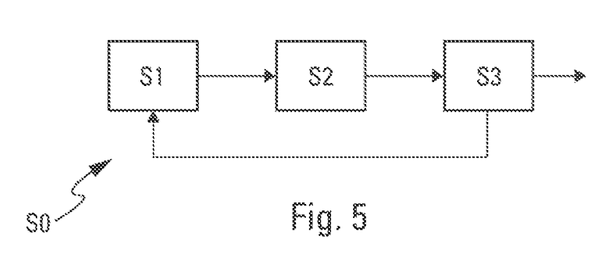
FIG. 5 is the block diagram of successive substeps of a processing step, which are implemented by the data processing unit.

The succession of substeps comprises, as shown in FIGS. 2 and 5:
a generation substep S1 implemented by the generation unit 9 and consisting in or comprising generating one or more so-called next states from a so-called computational state;
a cost computation substep S2 implemented by the cost computation unit 10 and consisting in or comprising computing an estimated overall cost CG for each of the next states generated in the generation substep S1. The estimated overall cost CG is equal to the sum of a computed real cost C1 and an estimated cost C2 computed using the neural network 12; and
an identification substep S3 implemented by the identification unit 14 and consisting in or comprising identifying, among the next states generated in the generation substep S1, the state having the lowest estimated overall cost, the state thus identified representing the so-called next state of the iteration under consideration.

This succession of substeps S1 to S3 is implemented iteratively until the state identified in the identification step S3 is situated at least in a predetermined proximity to the current state EC. The vertical trajectory then obtained between the target state E0 and the identified state represents the generated optimum vertical trajectory.

In order to generate one or more next states from the computational state, the generation substep S1 uses movement equations for the aircraft integrating, preferably, total slope and energy sharing factor values on the basis of distance.

In the cost computation substep S2, for each next state under consideration, the next state and the current state of the aircraft are entered into the neural network 12, which computes the cost estimated between the next state and the current state of the aircraft.

In one particular embodiment, in the cost computation substep S2, the estimated cost C2 is corrected by taking account of atmospheric conditions such as wind and/or a temperature difference of ΔISA type. The estimated cost thus corrected is used to compute the estimated overall cost CG.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating an optimum vertical trajectory for an aircraft, the vertical trajectory being defined between a current state of the aircraft, including a current position of the aircraft, and a target state, including a target position, the method comprising:
   a processing step implemented by a data processing unit, the processing step including a succession of substeps implemented iteratively, the processing step comprising determining, on each iteration, a next state from a computational state, each next state thus determined having an associated trajectory part defined between the target state and the next state;
   wherein the state determined in the processing step for a given iteration being used in the next iteration as computational state and the computational state taken into account during a first iteration is the target state;
   wherein the processing step is implemented until the determined next state is situated at least in a predetermined proximity to the current state of the aircraft, the trajectory part associated with this state situated in a predetermined proximity to the current state of the aircraft forming the optimum vertical trajectory;
   a data transmission step, implemented by a data transmission link, comprising transmitting at least the optimum vertical trajectory to at least one user system;
   wherein the processing step comprises, in order to determine a next state on each iteration, a succession of substeps comprising:
      a generation substep comprising generating one or more next states from the computational state;
      a cost computation substep comprising computing an estimated overall cost for each of the next states generated in the generation substep, the estimated overall cost being equal to a sum of a real cost computed between the target state and the next state under consideration by taking into account predetermined constraints and an estimated cost computed between the next state under consideration and the current state of the aircraft, the estimated cost being computed using at least one deterministic neural network based on performance calculations for the aircraft without taking into account energy constraints, the states corresponding to nodes of the neural network; and
      an identification substep comprising identifying, among the next states generated in the generation substep, a state having the lowest estimated overall cost, the state thus identified representing the next state in the iteration under consideration.

2. The method according to claim 1, wherein in the cost computation substep, for each next state under consideration, the next state and the current state of the aircraft are entered into the neural network, which computes the estimated cost between the next state and the current state of the aircraft.

3. The method according to claim 1, wherein in the cost computation substep, the estimated cost is corrected by taking into account atmospheric conditions, the estimated cost thus corrected being used to compute the estimated overall cost.

4. The method according claim 1, wherein, in the neural network, a node representing a state is defined at least by a distance in relation to a predetermined position, an altitude, a speed and at least one flight parameter.

5. The method according to claim 1, wherein in order to generate one or more next states from the computational state, the generation substep uses movement equations for the aircraft integrating total slope and energy sharing factor values.

6. The method according to claim 1, comprising a learning step, implemented subsequently to the processing step, comprising subjecting the neural network to learning.

7. The method according to claim 6, wherein the input data that the learning step uses for learning of the neural network are an initial position, a final position and a cost for a plurality of optimum trajectories, the optimum trajectories being defined for different and constraint-free initial and final conditions.

8. A device for generating an optimum vertical trajectory for an aircraft, the vertical trajectory being defined between a current state of the aircraft, including a current position of the aircraft, and a target state, including a target position, the device comprising:
   a data input unit;
   a data processing unit implementing iterative processing, the data processing unit being configured to determine, on each iteration, a next state from a computational state, each next state thus determined having an associated trajectory part defined between the target state and the next state, the state determined in a given iteration being used in the next iteration as computational state, the computational state taken into account during the first iteration being the target state, the data processing unit repeating iterative processing until the determined state is situated at least in a predetermined proximity to the current state of the aircraft, the trajectory part associated with this state situated in a predetermined proximity to the current state of the aircraft forming the optimum vertical trajectory; and a data transmission link comprising transmitting at least the optimum vertical trajectory to at least one user system, wherein the data processing unit comprises:

a generation unit comprising generating, on each iteration, one or more next states from the computational state;

a cost computation unit comprising computing an estimated overall cost for each of the next states generated by the generation unit, the estimated overall cost being equal to a sum of a real cost computed between the target state and the next state under consideration by taking into account predetermined constraints and an estimated cost computed between the next state under consideration and the current state of the aircraft, the estimated cost being computed using at least one deterministic neural network;

the neural network, which is based on performance calculations for the aircraft without taking into account energy constraints, the states corresponding to nodes of the neural network; and an identification unit comprising identifying, among the next states generated by the generation unit, the state having the lowest estimated overall cost, the state thus identified representing the next state in the iteration under consideration.

9. The device according to claim 8, comprising, as user system, a display unit configured to display at least the optimum vertical trajectory.

* * * * *